United States Patent [19]

Charbonnier et al.

[11] 3,870,561

[45]*Mar. 11, 1975

[54] ELECTRIC ACCUMULATOR

[75] Inventors: Jean-Claude Charbonnier, St.-Germain-en-Laye, France; Helmut Tannenberger, Geneve, Switzerland

[73] Assignee: Battelle Memorial Institute, Geneva, Switzerland

[ * ] Notice: The portion of the term of this patent subsequent to Nov. 20, 1990, has been disclaimed.

[22] Filed: Nov. 17, 1972

[21] Appl. No.: 307,560

Related U.S. Application Data

[63] Continuation-in-part of Ser. No. 79,204, Oct. 8, 1970, Pat. No. 3,730,771, and a continuation-in-part of Ser. No. 232,798, March 8, 1972, Pat. No. 3,773,558.

[30] Foreign Application Priority Data

Oct. 9, 1969 Switzerland.................... 15148/69
Mar. 9, 1971 Switzerland.................... 3400/71

[52] U.S. Cl............ 136/6 LN, 136/100 R, 136/146, 136/154
[51] Int. Cl. ......................................... H01m 35/02
[58] Field of Search............ 136/6 LN, 6 R, 6 L, 83, 136/100, 146, 154, 155

[56] References Cited
UNITED STATES PATENTS

| | | | |
|---|---|---|---|
| 3,110,630 | 11/1963 | Wolfe, Jr. ............... | 136/6 |
| 3,446,668 | 5/1969 | Arrance et al. ............... | 136/146 |
| 3,484,296 | 12/1969 | Buzzelli ............... | 136/100 R |
| 3,531,328 | 9/1970 | Bro et al. ............... | 136/100 R |
| 3,535,163 | 10/1970 | Dzieciuch et al. ............... | 136/6 |
| 3,681,144 | 8/1972 | Dey et al. ............... | 136/83 R |
| 3,730,771 | 5/1973 | Tannenberger et al. ............... | 136/6 |
| 3,773,558 | 11/1973 | Charbonnier et al. ............... | 136/6 LN |

Primary Examiner—Howard S. Williams
Assistant Examiner—C. F. LeFevour
Attorney, Agent, or Firm—Karl F. Ross; Herbert Dubno

[57] ABSTRACT

The housing of an accumulator cell is divided into an anodic compartment and a cathodic compartment by a fluidtight separator of beta alumina permselective to ions from an anode which includes, as an active constituent, an alkali or alkaline-earth metal (e.g. sodium) or lanthanum. The cathode compartment contains an electrolyte in the form of a solution of a salt of the metal of the active anode constituent in a polar organic solvent, capable of dissolving a virtual reaction product formed during the discharge of the accumulator, together with a cathode in the shape of an electronically conductive sintered structure incorporating a cathodically reducible metal compound such as a fluoride of a transition metal. The anode, whose active constituent is classified in group IA, IIA, IIB, or IIIB of the Periodic Table, may include a second metal of the same class forming with it an alloy which is at least partly liquid at an operating temperature of up to about 100° C.

14 Claims, 1 Drawing Figure

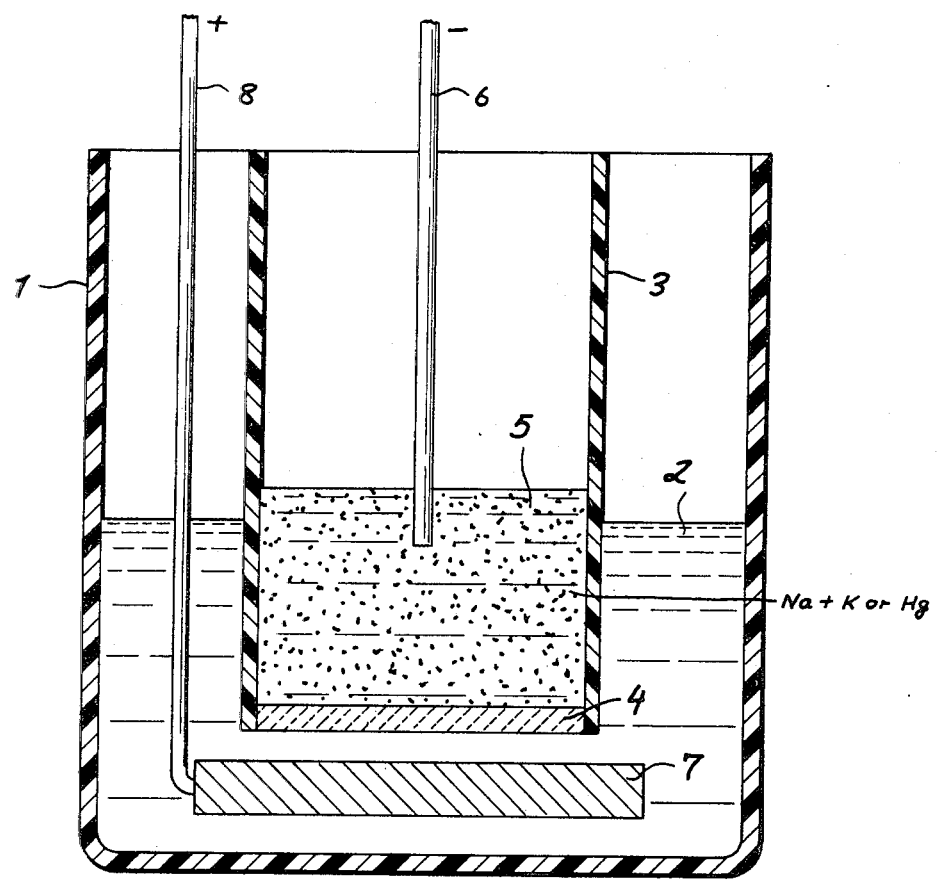

ELECTRIC ACCUMULATOR

This application is a continuation-in-part of our co-pending applications Ser. Nos. 79,204, now U.S. Pat. No. 3,730,771, filed Oct. 8, 1970, and 232,798, filed Mar. 8, 1972, now U.S. Pat. No. 3,773,558.

Our present invention relates to an electric accumulator or storage battery of the type wherein the housing of a battery cell is subdivided into an anodic compartment and a cathodic compartment by a solid, fluidtight separator or partition which is permeable to the ions of an active metallic constituent of the associated anode.

Such a permselective separator generally consists of a ceramic material, specifically a beta alumina, e.g. as described in U.S. Pat. Nos. 3,458,356 and 3,535,163. In prior systems incorporating such separators, however, the accumulator had to be operated at very high temperatures (upward of about 300° C.) to generate the necessary ion flow between the anode and cathode materials contacting the separator from opposite sides.

The object of our present invention, therefore, is to provide an accumulator of this general type efficiently operable at ambient or moderately elevated temperatures.

As disclosed in application Ser. No. 79,204, this object can be realized by immersing the solid cathode, whose sintered and electrically conductive structure incorporates a cathodically reducible metal compound, in a nonaqueous electrolyte consisting essentially of a solution of a salt of the metal of the active anode constituent in an organic solvent capable of dissolving a reaction product composed of cations of that metal and anions of the reducible cathode compound. This reaction product may be characterized as virtual since, at least in the initial discharge stage, it is present only in the form of its cations and anions.

As further described in that copending application, the active anode constituent may be an alkali metal such as lithium, sodium, potassium or rubidium, an alkaline-earth metal such as calcium, strontium or barium, or lanthanum; sodium, in particular, stands out as the preferred constituent. The reducible cathode compound, serving as an electron acceptor, may be a halide, an oxide or a sulfide of a transition metal such as iron, nickel, cobalt, chromium, copper or vanadium, though a mercury or a silver salt could also be used. Particularly preferred are the transition-metal fluorides such as $FeF_2$, $FeF_3$, $CuF_2$, $NiF_2$ and $CoF_3$. The beta alumina used for the separator, which includes an oxide of the metal of the active anode constituent to facilitate the migration of cations therethrough, may have the following compositions: $Na_2O \cdot 11Al_2O_3$, $K_2O \cdot 11Al_2O_3$, $Rb_2O \cdot 11Al_2O_3$, $Cs_2O \cdot 11Al_2O_3$, $Li_2O \cdot 11Al_2O_3$, $CaO \cdot 6Al_2O_3$ and $La_2O_3 \cdot 11Al_2O_3$. Thus, with sodium as the active anode metal, the preferred composition is $Na_2O \cdot 11Al_2O_3$. Suitable solvents include dimethylformamide, N,N'-dimethylacetamide, N-methylacetamide, gamma-butyrolactone, tetrahydrofurane or propylene carbonate. The sintered cathode structure may have distributed therethrough an ancillary conductor which preferably is a material corresponding to the metallic component of the reducible metallic compound, e.g. nickel.

In a system of this character, as likewise disclosed in our application Ser. No. 79,204, the migration of cations through the separator at ambient temperatures can be further facilitated by the interposition of an electrolytic body between the anode and the separator, this body consisting essentially of a solution of the aforementioned salt of the metal of the anode material in an organic solvent which may or may not be the same as that of the electrolyte in the cathode compartment.

As disclosed in application Ser. No. 232,798, the active anode constituent is alloyed with at least one other metal for the purpose of promoting the diffusion of cations through the separator, without the use of such an organic electrolyte on the anode side, and/or for effectively protecting the active anode material from oxidation or the corrosive effect of moisture, thereby obviating the need for a hermetic enclosure. The active constituent, and advantageously also the other metal, may be taken from Group IA, IIA, IIB or IIIB of the Periodic Table; it preferably is an alkali or alkaline-earth metal. With sodium as the active constituent, for example, the other metal may be another alkali metal, such as potassium, or a heavier metal (e.g. mercury) having the aforementioned protective effect. In accordance with our present invention, the composition of the two (or possibly more) anode metals is entirely liquid at an operating temperature of up to about 100° C.

The sole FIGURE of the accompanying diagrammatic drawing illustrates, in vertical section, an embodiment of an electric accumulator according to the invention.

The accumulator cell shown in the drawing comprises a glass receptacle 1 containing a saturated solution 2 of the sodium chloride in dimethylformamide. A glass receptacle 3, smaller than the receptacle 1, is mounted inside the latter and partly dips into the solution 2. The lower end of the receptacle 3 is closed off by a partition 4 of sodium beta alumina, acting as a cation-permeable ceramic separator, and by a glass seal not shown. The receptacles 1 and 3 are filled with an atmosphere of inert gas, here pure argon. The receptacle 3 contains an anode 5 of the aforedescribed type preferably consisting at least partly of sodium.

A conductor 6, which consists of a platinum wire and is in contact with the anode, serves to connect the accumulator to an external load circuit, not shown. The cathode 7 of the accumulator is a flat disk of porous structure produced by sintering a mixture of nickel fluoride $NiF_2$ and metallic nickel, containing 34 percent by weight of $NiF_2$. This disk is placed in the solution 2, in confronting relationship with the partition 4, at a distance of 1 mm from the latter. The cathode 7 is connected to the load circuit by means of a conductor 8 constituted by a nickel wire.

The partition 4 of beta alumina can be produced, for instance, by simultaneous sintering and chemical reaction from pure alpha alumina and powdered sodium carbonate blended in suitable proportions to achieve an approximate final molar ratio of 11:1 of alumina and sodium oxide (approximate final composition: $Na_2O \cdot 11Al_2O_3$). The two powders are intimately mixed in a ball grinder and the mixture is compacted with an isostatic press at a pressure of 25 metric tons per square centimeter in the form of a "carrot" of approximately cylindrical shape which is sintered for 4 hours in an oxidizing atmosphere at 1570°C. After sintering, the plate 4 is cut out of the carrot in the form of a flat disk of the required size, here with a diameter of 1 cm and a thickness of 1 mm.

The above-described accumulator operates at a temperature between ambient and about 100° C. as follows:

During discharge of the accumulator, the sodium of the anode is ionized in the liquid phase, giving off one electron for each sodium ion formed. The electrons thus released are fed to the load circuit via the conductor 6. The sodium ions traverse the separator 4 and then pass into the organic solution 2. At the cathode 7, the nickel fluoride is decomposed into its elements, accepting in so doing two electrons per $NiF_2$ molecule, with formation of metallic nickel which remains in the porous structure of the cathode 7 and $F^-$ ions which pass into the solution 2. The number of $F^-$ ions being formed is equal to that of the $Na^+$ ions passing into the solution 2. The overall chemical reaction is thus given by the following relationship:

$$2Na + NiF_2 \rightarrow 2Na^+ + 2F^- + Ni$$

and is the sum of the following two electrochemical reactions which respectively take place at the anode and at the cathode:

$$2Na \rightarrow 2Na^+ + 2e^-$$
$$NiF_2 + 2e^- \rightarrow Ni + 2F^-$$

The electrons are returned from the load circuit to the cathode 7 by the conductor 8.

Thus, as the accumulator discharges, the sodium contained in the receptacle 3 is depleted, as is the nickel fluoride of the cathode, whereas metallic nickel forms at the cathode and the solution 2 becomes enriched with the anions and cations of the virtual reaction product, i.e. sodium fluoride.

The recharging of the accumulator is done by causing electric current to pass into the accumulator with a polarity supplying electrons to the anode 5 and removing electrons from the cathode 7, with the aid of an electric current source whose negative terminal is connected to the anode 5 and whose positive terminal is connected to the cathode 7. During charging, the aforedescribed reactions are reversed so that, at the cathode, the nickel is transformed into nickel fluoride, the solution 2 is depleted of sodium fluoride and metallic sodium forms in the receptacle 3.

We shall now describe several compositions which can be used for the anode 5 in order to improve the efficiency of the accumulator at operating temperatures between about 20° C. and 100° C.

EXAMPLE

Anode 5 is a sodium/potassium alloy consisting of 65%, by weight, of sodium and 35%, by weight, of potassium. At an operating temperature of 30°C, the entire composition is in a liquid state.

This example is representative of a variety of compositions in which the alloy has a eutectic that melts below the operating temperature. In the specific instance of sodium and potassium, the eutectic occurs at 76.7% (by weight) of potassium and melts at −12.5°C.

Besides sodium, alkali or alkaline-earth metals to be amalgamated or mixed with other metals (especially from Group IA, IIA, IIB or IIIB of the Periodic Table) in accordance with the foregoing Example include lithium, potassium, rubidium, calcium, strontium and barium.

Accumulators according to the invention can, if required, be connected to one another in series and/or in parallel so as to form a battery of desired electromotive force and capacity.

We claim:

1. An electric accumulator comprising:
   a container divided into an anodic compartment and a cathodic compartment;
   an anode in said anodic compartment consisting essentially of a composition of an active metallic constituent and at least one other metal, said metallic constituent being taken from Group IA, IIA, IIB or IIIB of the Periodic Table, said metallic constituent forming with said other metal an alloy which is liquid at an operating temperature of up to about 100°C;
   a solid cathode in said cathodic compartment having a sintered electronically conductive structure incorporating a cathodically reducible metal compound;
   a solid fluidtight separator consisting of beta alumina permeable to the ions of said metallic constituent between said compartments; and
   an electrolyte in said cathodic compartment consisting essentially of a solution of a salt of the metal of said constituent in an organic solvent capable of dissolving a reaction product composed of cations of said constituent and anions of said reducible compound, said cathode being immersed in said electrolyte in spaced relationship with said separator.

2. An accumulator as defined in claim 1 wherein said composition is an alloy with a eutectic melting below said operating temperature.

3. An accumulator as defined in claim 1 wherein said metallic component is an alkali metal or an alkaline-earth metal.

4. An accumulator as defined in claim 3 wherein said metallic constituent is lithium, sodium, potassium, rubidium, calcium, strontium or barium.

5. An accumulator as defined in claim 4 wherein said composition is a mixture of sodium and potassium.

6. An accumulator as defined in claim 1 wherein said beta alumina has substantially the composition $Na_2O \cdot 1-1Al_2O_3$, said metallic constituent being sodium.

7. An accumulator as defined in claim 1 wherein said reducible metal compound is a halide, an oxide or a sulfide of a transition metal, silver or mercury.

8. An accumulator as defined in claim 7 wherein said reducible metal compound is a fluoride.

9. An accumulator as defined in claim 8 wherein said fluoride is $FeF_2$, $FeF_3$, $CuF_2$, $NiF_2$ or $CoF_3$.

10. An accumulator as defined in claim 1 wherein the salt dissolved in said electrolyte is a chloride, a perchlorite or a hexafluorophosphate.

11. An accumulator as defined in claim 10 wherein said salt is sodium chloride in saturating concentration.

12. An accumulator as defined in claim 1 wherein said solvent is dimethylformamide, N,N'-dimethylacetamide, N-methylacetamide, gamma-butyrolactone, tetrahydrofurane or propylene carbonate.

13. An accumulator as defined in claim 1 wherein said cathode includes an ancillary conductor distributed throughout said structure.

14. An accumulator as defined in claim 13 wherein said ancillary conductor is a metal corresponding to the metallic component of said reducible metal compound.

* * * * *

Dedication 3,870,561.—*Jean-Claude Charbonnier*, St.-Germain-en-Laye, France and *Helmut Tannenberger*, Geneve, Switzerland. ELECTRIC ACCUMULATOR. Patent dated Mar. 11, 1975. Dedication filed Mar. 26, 1984 by the assignee, *Battelle Memorial Institute.*

Hereby dedicates to the People of the United States the entire remaining term of said patent.

[*Official Gazette May 29, 1984.*]